United States Patent
Phan Le et al.

(10) Patent No.: US 8,957,859 B2
(45) Date of Patent: Feb. 17, 2015

(54) METHOD AND APPARATUS FOR MISALIGNMENT COMPENSATION IN OPTICAL JOYSTICKS

(75) Inventors: Kim Phan Le, Eindhoven (NL); Sebastien Mouy, Eindhoven (NL)

(73) Assignee: NXP, B.V., Eindhoven (NL)

( * ) Notice: Subject to any disclaimer, the term of this patent is extended or adjusted under 35 U.S.C. 154(b) by 201 days.

(21) Appl. No.: 13/695,256

(22) PCT Filed: Apr. 12, 2011

(86) PCT No.: PCT/IB2011/051574
§ 371 (c)(1),
(2), (4) Date: Oct. 29, 2012

(87) PCT Pub. No.: WO2011/145006
PCT Pub. Date: Nov. 24, 2011

(65) Prior Publication Data
US 2013/0069875 A1 Mar. 21, 2013

(30) Foreign Application Priority Data
May 18, 2010 (EP) .................................... 10290261

(51) Int. Cl.
| G06F 3/033 | (2013.01) |
| G06F 3/038 | (2013.01) |
| G06F 3/0338 | (2013.01) |
| G06F 3/042 | (2006.01) |

(52) U.S. Cl.
CPC .............. *G06F 3/038* (2013.01); *G06F 3/0338* (2013.01); *G06F 3/042* (2013.01)
USPC ........................................................ 345/161

(58) Field of Classification Search
CPC .................... G05G 9/047; G05G 2009/04759; G06F 3/0304; G06F 3/0325; G06F 3/0338
USPC ......................................... 345/157, 161, 167
See application file for complete search history.

(56) References Cited

U.S. PATENT DOCUMENTS

| 5,757,425 A | 5/1998 | Barton et al. |
| 6,791,531 B1 | 9/2004 | Johnston et al. |
| 7,136,592 B2 | 11/2006 | Schmatz |

(Continued)

FOREIGN PATENT DOCUMENTS

| WO | 2009/125360 A2 | 10/2009 |
| WO | 2010/020906 A1 | 2/2010 |
| WO | 2010/035170 A1 | 4/2010 |

OTHER PUBLICATIONS

International Search Report as published for application No. PCT/IB2011/051574 (Aug. 2, 2011).

*Primary Examiner* — Gene W Lee

(57) ABSTRACT

An apparatus for misalignment compensation in optical joysticks is described. The optical joystick includes a light source, a plurality of photodetectors, and circuitry for controlling operation of the optical joystick. In some embodiments, each of the photodetectors may partitioned into a plurality of photodetector elements and select photodetector elements are configured to be individually activated in order to cause an electrical shifting of the selected photodetector elements to achieve a different operational alignment position of optical components of the optical joystick. In some embodiments, the light source may be similarly be calibrated by individually activating portions of a light-source array to cause an electrical shift. Various other embodiments and methods of operation are also described.

15 Claims, 14 Drawing Sheets

(56) References Cited

U.S. PATENT DOCUMENTS

| | | |
|---|---|---|
| 8,558,162 B2 * | 10/2013 | Phan Le .................. 250/221 |
| 8,698,067 B2 * | 4/2014 | Geloven et al. ............. 250/221 |
| 2007/0126700 A1 * | 6/2007 | Wright .................... 345/161 |
| 2009/0073119 A1 * | 3/2009 | Phan Le et al. ............. 345/161 |
| 2009/0101802 A1 * | 4/2009 | Phan Le et al. ............. 250/221 |
| 2009/0101803 A1 * | 4/2009 | Phan Le .................. 250/221 |
| 2009/0101804 A1 * | 4/2009 | Phan Le .................. 250/221 |
| 2009/0231165 A1 * | 9/2009 | Phan Le .................... 341/20 |
| 2011/0031380 A1 | 2/2011 | Phan Le |
| 2011/0168874 A1 | 7/2011 | Phan Le |
| 2011/0174959 A1 * | 7/2011 | Geloven et al. ............ 250/208.6 |
| 2012/0032881 A1 | 2/2012 | Le Phan |

* cited by examiner

METHOD AND APPARATUS FOR MISALIGNMENT COMPENSATION IN OPTICAL JOYSTICKS

FIELD OF THE INVENTION

Various exemplary embodiments disclosed herein relate generally to optical joysticks. More particularly, various embodiments relate to method and apparatus for misalignment compensation in optical joysticks for handheld communication devices.

BACKGROUND OF THE INVENTION

Hand-held communication devices, particularly mobile telephones, personal digital assistants (PDA's), and the like, include a class of portable electronic devices, whose size enables them to be held in one hand while being operated with the other. Typical hand-held communication devices include a joystick for allowing a user to make selections while operating a hand-held device.

Many mobile phones on the market use a stepwise joystick which enables a user to move a cursor on the display only in a series of discrete steps, in four directions (e.g., left, right, up, and down), with the user clicking vertically on the stepwise joystick in order to select a desired item on the display.

Various analog joystick designs based on the optical reflection principle have been proposed. Such optical-reflection analog (ORA) joysticks may overcome the limitations of stepwise joysticks and the ORA joysticks may be used in mobile phones for applications, such as, for example, navigation, mobile gaming, and web browsing. ORA joysticks may enable movement over the full display screen in all directions (i.e., full 360° of direction), while also enabling the user to move the cursor with a continuous, variable speed, which is desired for navigation, web browsing applications, movement over a map, reading point-of-interest information, press-to-select, drag-and-drop, zoom, and similar mobile applications that use a user-controlled cursor, and are suited for use in a handheld device. Further details about analog joysticks are described in WO2010/035170, WO2010/020906, WO2009/125360 assigned to the present assignee, the entire contents of which are incorporated herein by reference.

In prior proposed approaches, enhanced performance could have only been achieved if all the applicable optical components, such as the light source, reflector or reflective element (e.g., reflector), and photodetectors of the joystick device were all well-aligned. Misalignment of any one of the optical components of the joystick device leads to asymmetry, degrading the performance of the device. Other approaches to overcome the misalignment problem have been proposed, but have also been observed to be costly and slow, especially for high-volume production.

FIG. 1 is a high-level schematic of a conventional optical joystick 100. The joystick 100 includes an IC package 111 having a substrate 102 on which lies, for example, an ASIC die 104, a light source 106 (e.g., LED), and a plurality of photodetectors 108 (e.g., photodiodes). A hard frame 110 supports a knob 116, which is hung directly above the light source 106. The knob 116 is hung on a suspension construction which includes a metal spring 112. A reflector 114 (that may be, for example, a mirror) is formed on the bottom side of the knob 116, directly facing the light source 106 such that light from the light source 106 is reflected by the reflector 114, towards photodetectors 108. The reflector 114 may be symmetrically-shaped (e.g., square or round shape). The light source 106 is located at a center of the photodiodes or photodetector configuration 108, with the photodetectors 108 located symmetrically around the light source 106, the details of which are illustrated in FIGS. 2A and 2B. The IC package 111 has a cavity 113 above the light source 106 and the photodetectors 108. It will be understood that the substrate 102 can be molded inside a transparent material which may also serve as an IC package while still permitting light to pass through the package. Further details of the joystick 100 have been described WO2010/035170, the entire contents of which are incorporated herein by reference.

Continuing to refer to FIG. 1, knob 116 is mounted on a suspension construction that allows the knob 116 to tilt around a rotation point when a force from a user's finger is applied, and is urged by the metal spring 112 to return to a central position (e.g., rest position) when the force is removed.

FIGS. 2A and 2B are side-views of the optical joystick of FIG. 1, with FIG. 2A depicting the knob in a rest position and FIG. 2B depicting the knob in a tilt position, respectively. FIGS. 2C and 2D are top-views of the optical joystick of FIG. 1, with the knob in a rest position in FIG. 2C and a tilt position in FIG. 2D, respectively. In FIGS. 2A-2D, all the applicable optical components may be in perfect alignment.

In operation, when the joystick 100 is in a rest position where no force from a user's finger is applied, the reflector 114 is positioned as perfectly parallel and centered to the plurality of photodetectors 108 and light source 106 as shown in FIG. 2A. In this position, a light spot reflected by the reflector 114 falls symmetrically on the photodetectors 108, thereby providing zero differential signals in the XY planes at differential circuits 201, quantified as $S_x=S_y=0$, as shown in FIG. 2C. When the joystick 200 is used by the user, such as for moving a cursor position on a display, the user, upon applying a force on the knob 116, causes the knob 116 to tilt, thus causing the reflector 114 to tilt proportionally in a direction, thereby resulting in non-zero differential signals in the X-axis and/or Y-axis at differential circuits 201 between the photodetectors 108 as shown as $S_x \neq 0$ in FIG. 2D. The differential signals $S_x$ and $S_y$ at the output of differential amplifiers in differential circuits 201 are converted into cursor speed in a desired direction. The differential signals $S_x$ and $S_y$ are proportional to the tilt angle of the reflector 114; therefore, a larger reflector tilt angle results in larger differential signals $S_x$ and $S_y$, a faster movement of the cursor in a given direction.

Continuing to FIGS. 2A-2D, to select an item on the display, a user can use a click-to-select function of the joystick 200. In order to achieve this function, a user may have to move the cursor using the joystick 200 to a position of the item desired to be selected by the user, then stop the joystick 200 by releasing the knob 116, and then press down vertically with a certain force (i.e., clicking down on the knob 116). During the click action by the user, the reflector 114 moves horizontally downward. In this process, the differential signals on the photodetectors 108 remain substantially zero, but signal amplitude on the photodetectors 108 increases due to an increase in light irradiance falling on the substrate 102. By detecting a threshold in the common mode signal of all the photodetectors 108, the selection signal can be generated. In FIGS. 1 and 2A-2D, a relatively limited number of photodetectors are shown. It will, however, be understood that more or less photodetectors may be used as desired.

FIG. 3 shows a diagram illustrating a calculated differential signal as a function of the reflector angle, wherein a tilt angle of the reflector is shown on the X-axis and the differential signal is shown on the Y-axis. Specifically, FIG. 3 shows the differential signal (e.g., for X-Y detection) as a function of tilt angle of reflector 114 (FIG. 2A-2B) in the case of perfect alignment (e.g., the diagram with round datapoints shown as signal curve 1 301 in FIG. 3)—indicating it is symmetric with respect to a rest position (e.g., tilt angle=0) of the knob 116.

However, in the presence of misalignment, when the reflector 114 is displaced by a certain distance (e.g., 40 μm) from the rest position, the differential signal $S_x$, $S_y$ becomes asymmetric, as illustrated in FIG. 3 as shown by signal curve 2 302. In this case, in the rest position, the differential signal is non-zero and the amount of signal change when the reflector 114 tilts with the same tilt angle in positive and negative directions is not symmetric anymore—this asymmetry causes degradation in the performance of the joystick 100. Albeit to a lesser extent, misalignment of the light source 106, and the initial angle of the reflector 114 at a rest position, as indicated in FIGS. 2B and 2D, may also contribute to the asymmetry of the differential signal, and thus degradation of performance of the joystick 100. Various correction schemes have been proposed without much success to correct large misalignment errors along with the slow times and high costs.

SUMMARY OF THE INVENTION

In light of the need for improved alignment of ORA joysticks, various methods and apparatus for misalignment compensation in ORA input devices, such as, for example, ORA joysticks are disclosed. The ORA joystick may include a light source, a plurality of photodetectors, and circuitry for controlling operation of the ORA joystick. In one embodiment, each of the photodetectors are partitioned into a plurality of photodetector elements that are individually activated to cause an electrical shifting of the photodetector elements to compensate for a misalignment of at least one optical component of the joystick. In another embodiment, the light source is partitioned into a plurality of light-source elements; select light-source elements are electrically activated to cause an electrical shifting of the light-source elements to compensate for a misalignment of at least one of optical components. In another embodiment, a combination of the above-described embodiments may be used.

A brief summary of various exemplary embodiments is presented. Some simplifications and omissions may be made in the following summary, which is intended to highlight and introduce some aspects of the various exemplary embodiments, but not to limit the scope of the embodiments.

In one aspect, an optical joystick is disclosed. The optical joystick includes a light source, a plurality of photodetectors, and circuitry for controlling operation of the optical joystick. Each of the photodetectors are partitioned into a plurality of photodetector elements and select photodetector elements are configured to be individually activated in order to cause an electrical shifting of the selected photodetector elements to achieve a different alignment position of optical components of the optical joystick.

In another aspect, a hand-held communication device includes a housing having an integrated circuit, a display for displaying information, an optical joystick for enabling a user to select information displayed on the display device.

In a further aspect, an optical joystick includes a light source; a plurality of photodetectors, wherein the light source and the plurality of photodetectors are formed on a substrate; and control circuitry for controlling operation of the optical joystick. The light source is partitioned into a plurality of light-source elements arranged in a two-dimensional array. Select light source elements of the plurality of light-source elements are configured to be individually activated to cause an electrical shifting of the selected light-source elements to achieve a different alignment position of optical components of the joystick.

In another aspect, an optical joystick includes a light source partitioned into a plurality of light-source elements and a plurality of photodetectors, wherein each of the photodetectors are partitioned into a plurality of photodetector elements. This joystick may also include a circuitry for controlling operation of the optical joystick, wherein a select number of the photodetector elements and a select number of the light-source elements are electrically activated to achieve a different alignment position of optical components of the joystick.

In a further aspect, a method for compensating for misalignment of optical components of an optical joystick having a light source and a plurality of photodetectors is disclosed. The method includes partitioning each of the photodetectors into a plurality of photodetector elements, partitioning the light source into a plurality of light-source elements, and driving an electrical circuit to electrically activate select ones of the photodetector elements and the light-source elements to cause electrical shifting of the photodetector elements and the light-source elements to compensate for optical component misalignments.

BRIEF DESCRIPTION OF THE DRAWINGS

In order to better understand various exemplary embodiments, reference is made to the accompanying drawings, wherein:

FIG. 13A shows when the working light source is at the center of the photodetector configuration and the reflector is well-aligned.

DETAILED DESCRIPTION OF THE EMBODIMENTS

Figure 1:
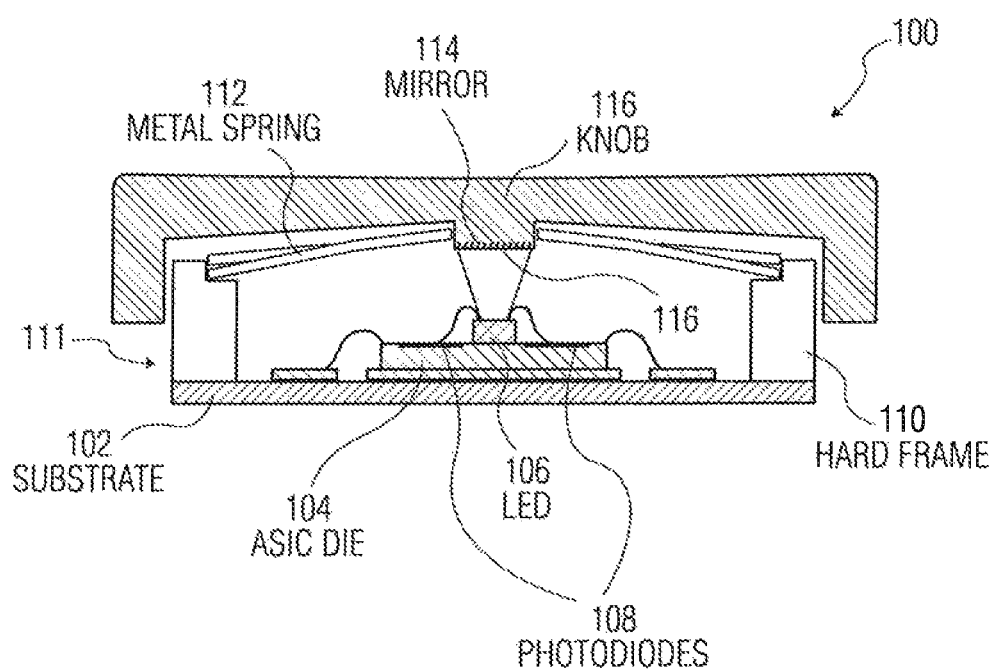
FIG. 1 is a side cross-sectional view of a conventional optical joystick.

Referring now to the drawings, in which like numerals refer to like components or steps, there are disclosed broad aspects of various exemplary embodiments.

Figure 4A:
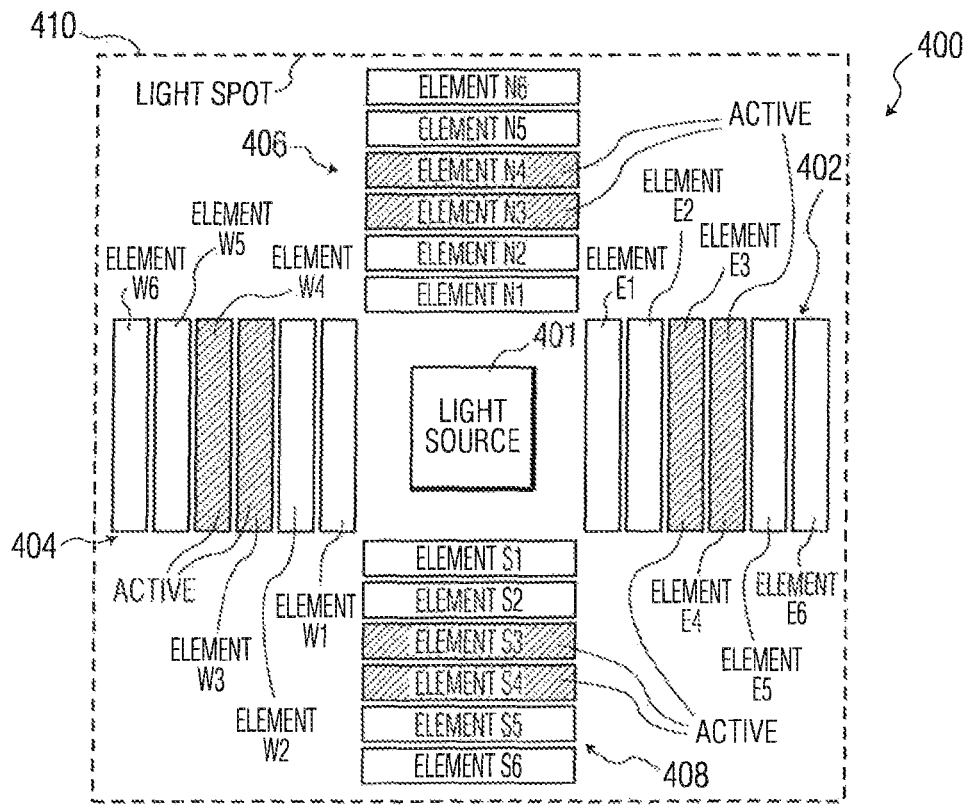
FIG. 4A shows an optical joystick in accordance with one embodiment.

FIG. 4A shows an optical joystick 400 in accordance with one embodiment wherein like elements are shown using like reference numerals in the drawings. The joystick 400 includes a light source 401 and a plurality of photodetectors 402, 404, 406, and 408. The joystick 400 is alternatively referred to herein as an input device. In this embodiment, light from the light source 401 is shown to be perfectly reflected to cover all the photodetectors and indicated by the hashed box 410. For simplicity, other components of joystick 400 are not shown in FIG. 4A—however, components shown at FIGS. 1 and 2A-2D may be included in the embodiment of FIG. 4A. Although only four groups of photodetectors 402-408 are shown for the sake of simplicity, more or less number of photodetectors may be used as desired. In alternative embodiments, the groups of photodetectors 402-408, may be arranged in different patterns, such as groups of concentric semi-circle arcs, and other geometric shapes (e.g., hexagonal and orthogonal groups).

Each of the photodetectors 402-408 are partitioned into a plurality of photodetector elements—for example, photodetector 402 (shown as located to the right of the light source 401 in the example embodiment) may be partitioned into elements E1, E2, E3, E4, E5, and E6. It will be understood that partitioning the photodetector 402 into six photodetector elements is shown only as an example, and therefore, photodetector 402 may contain a different number of photodetector elements than what is shown in FIG. 4. Similarly, other photodetectors 404-408 are each partitioned into a plurality of photodetector elements—photodetector 404 being partitioned into elements W1 through W6, photodetector 406 being partitioned into elements N1 through N6, and photodetector 408 being partitioned into elements S1 through S6, respectively. For convenience, each of the elements of the different photodetectors has been identified using abbreviations for the cardinal points of the compass, N, S, E, and W. The assignment of cardinal points is reflective of the geometric arrangement of photodetectors 402-408 to form concentric squares. In alternative embodiments, elements may be labeled in accordance with the geometric design.

In the embodiment shown in FIG. 4A, a number of photodetector elements from each of the photodetectors 402-408 are initially set as active (e.g., turned ON). For example, photodetector elements E3, E4, W3, W4, N3, N4, S3, and S4 are shown to be active (e.g., turned ON and identified in FIG. 4 by black markings). In this embodiment, the signal transmitted from a photodetector (e.g., 402-408 may be the sum of signals produced from its constituent active elements. For example, the signal generated by the photodetector 402 may be the sum of signals generated from active photodetector elements E3 and E4. Signals generated by the photodetectors 404-408 may similarly be the sum of signals generated by their constituent active elements.

Figure 4B:
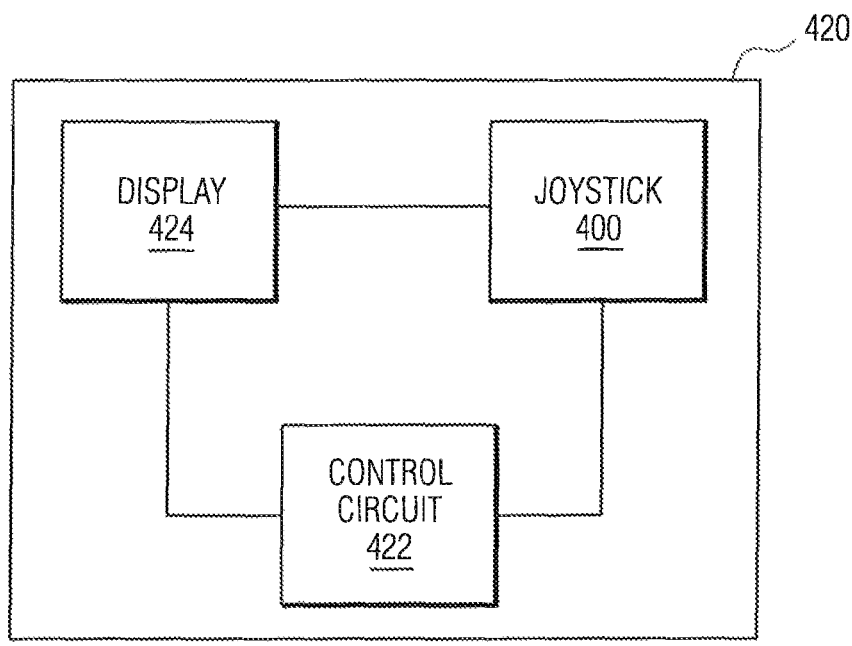
FIG. 4B is a schematic showing various components of a device having an optical joystick of FIG. 4A.

FIG. 4B illustrates a hand-held communication device 420, including the joystick 400, control circuitry 422 (e.g., a microprocessor) for controlling operations of the hand-held device 420, and a display device 424 for displaying information of the hand-held device 420. The hand-held device 420 can be a mobile communication device, a PDA, interactive handheld device (e.g., portable GPS device, gaming system, or media player) or similar such portable device. The control circuitry 422 (e.g., a microprocessor) may be formed as an integrated unit with the joystick device 400. In some embodiments, control circuitry 422 may contain a memory to store the configuration of photodetectors 402-408 and/or light source 401 in joystick 400, which will be discussed in for their detail below. In some embodiments, control circuitry 422 may comprise a plurality of processors and/or memory to control at least the joystick 400 and the display 424.

Figure 5:
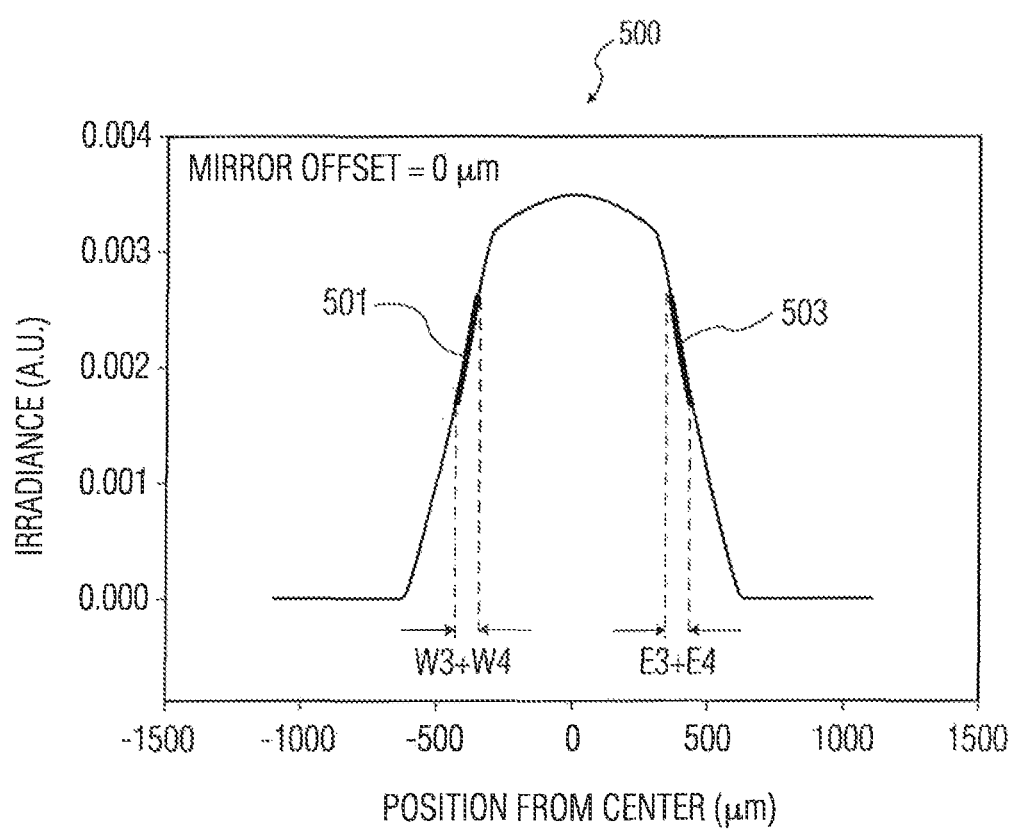
FIG. 5 depicts an exemplary irradiance profile for the optical joystick shown in FIG. 4.

FIG. 5 shows an exemplary irradiance profile 500 for the optical joystick shown in FIG. 4. It is believed preferable for this embodiment that each of the photodetectors (e.g., 402-408) be partitioned into at least three photodetector elements. The partition to at least three elements may allow each photodetectors 402-408 to be calibrated with a great degree of precision in accordance with tolerances allowed for various misalignments of optical components.

Figure 2A:
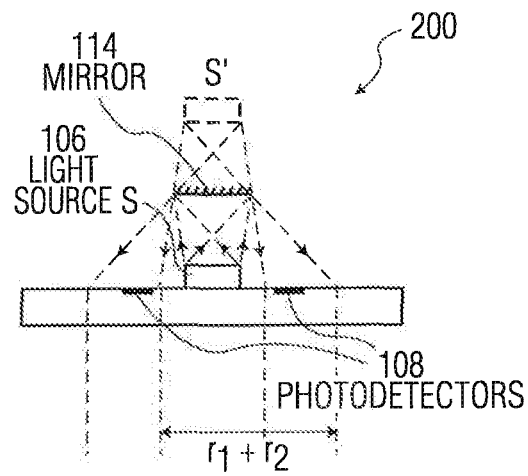
FIGS. 2A and 2B are side-views of the optical joystick of FIG. 1 with the knob in a rest position and a tilt position, respectively.
Figure 2B:
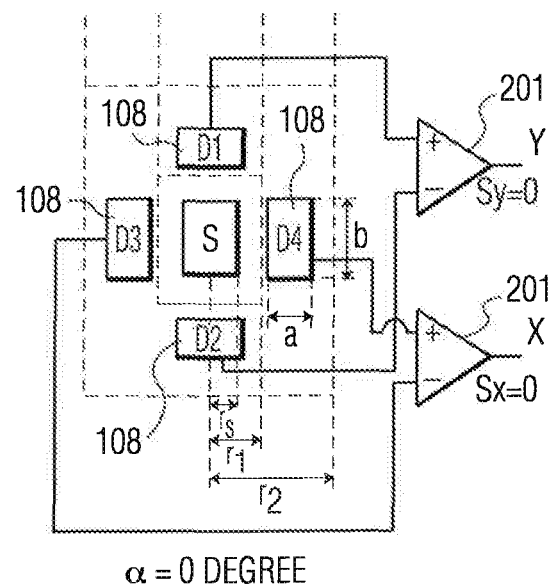
Figure 2C:
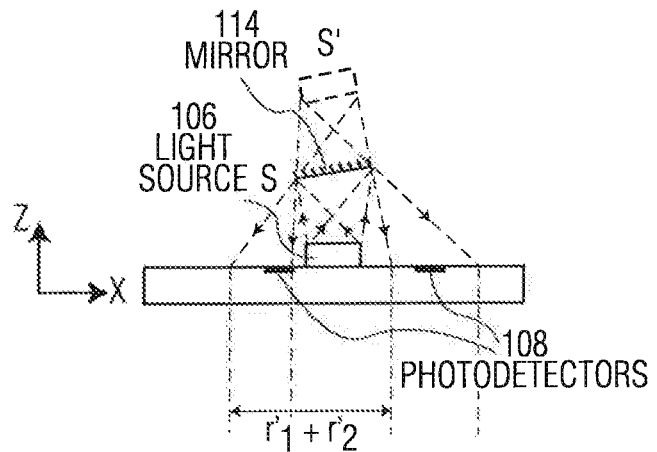
FIGS. 2C and 2D are top-views of the optical joystick of FIG. 1 with the knob in a rest position and a tilt position, respectively.
Figure 2D:
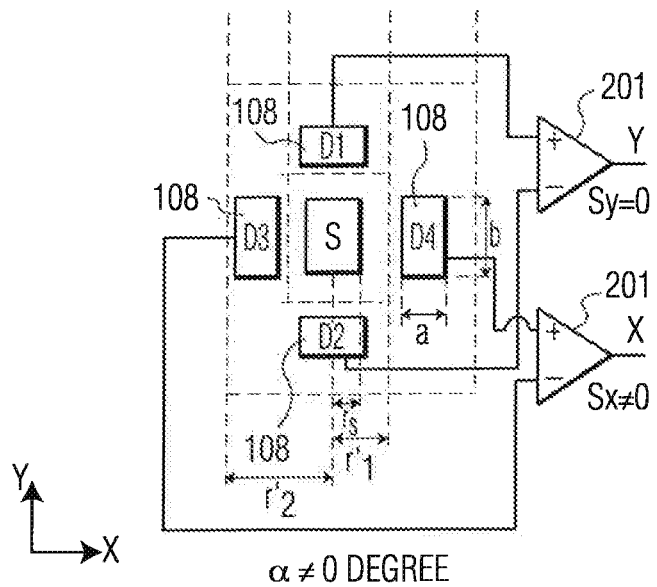

FIG. 5 specifically shows an irradiance profile 500 across a center of the substrate of joystick 400 from photodetector 404 to photodetector 402 (i.e., moving from element W6 to element E6), wherein a tilt angle of the reflector (not shown) is zero and all optical components are well-aligned (as in FIG. 2A). The active photodetector elements W3, W4 and E3, E4 may then lie on shoulders of the irradiance profile (highlighted as lines 501 and 503, respectively) and produce equivalent signal for photodetectors 404 and 402, respectively. The differential signal may therefore be zero due to the offsetting equivalent signals generated from photodetectors 402 and 404.

However, the actual assembly process to manufacture a joystick is far from ideal as exemplified in FIG. 4A; various misalignment issues can regularly arise. For example, the light source 401, which can be in the form of an LED die, is normally attached to the substrate with a lateral positioning accuracy of the order of a few tens of microns. In one example, the lateral accuracy can be of the order of ±30 lam. Similarly, the reflector is attached to a mechanical support (e.g., metal spring and knob) and has a positional accuracy on the order of about ±80 to ±100 μm with respect to the photodetectors 402-408 of FIG. 4A.

Figure 6:
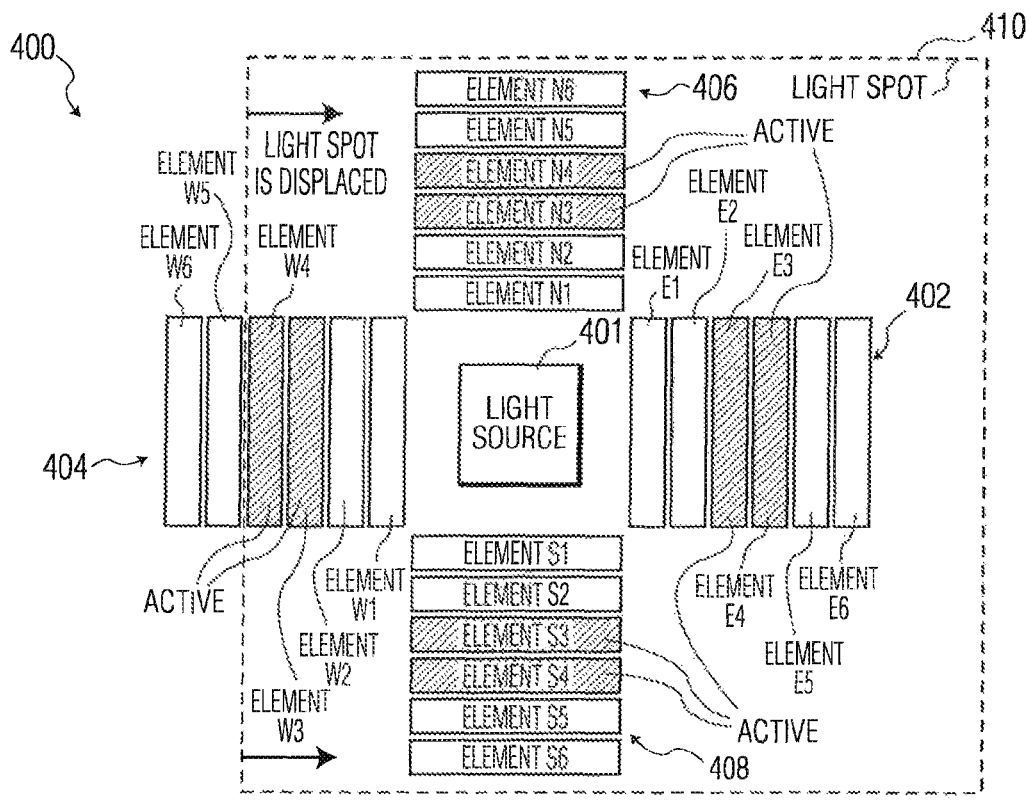
FIG. 6 is a top plan view of a portion of the joystick shown in FIG. 4A, but having a reflector misalignment.

FIG. 6 shows a schematic of the joystick 400 shown in FIG. 4A; however a reflector misalignment causes a displacement of the light spot 410, wherein the light spot 410 is displaced by a certain distance relative to the position of the light spot 401 shown in FIG. 4A. In the illustrative embodiment, the light spot 410 may be displaced laterally by a distance equivalent to the width of two photodetector elements (e.g., W6, W5).

Figure 3:
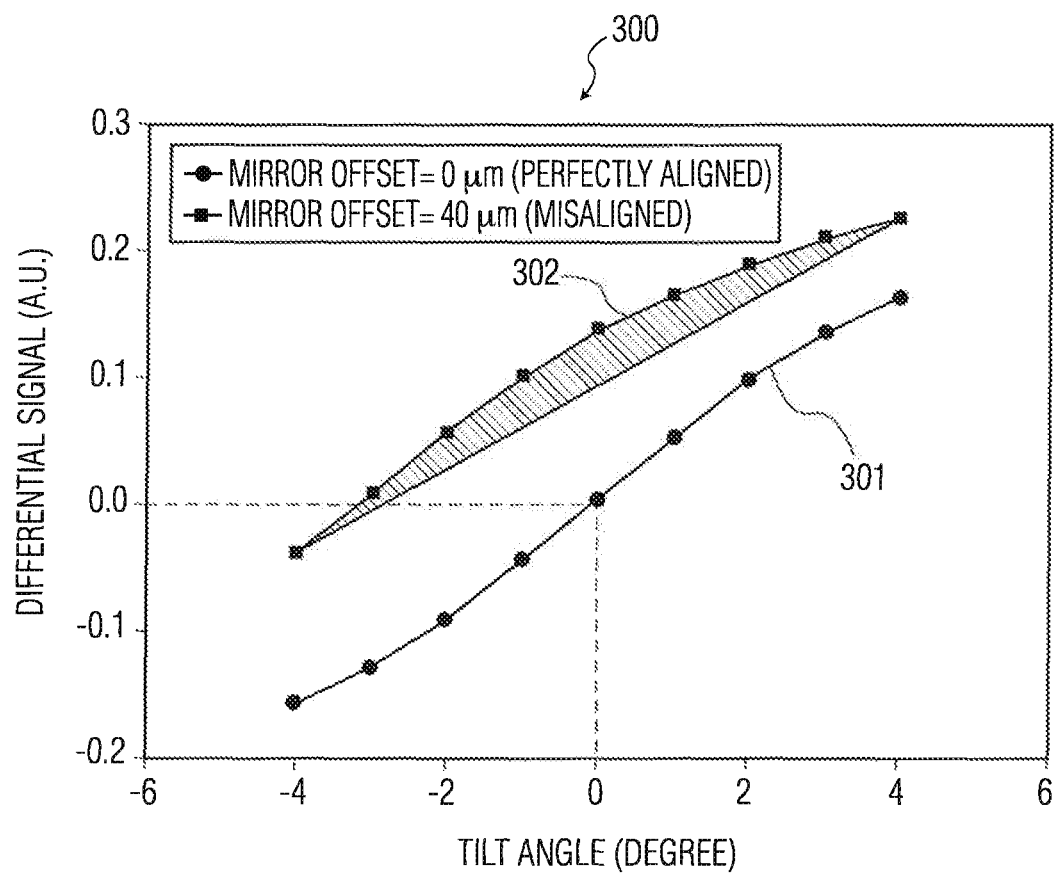
FIG. 3 depicts the calculated differential signal versus reflector angle, wherein a tilt angle of the reflector is shown on the X-axis and the differential signal is shown on the Y-axis.

Elements 401-408 in FIG. 6 are similar to components 401-408 in FIG. 4A and according function in a similar manner. As illustrated, the reflector is offset in a certain direction (e.g., 40 μm) in the X-axis (e.g., to the right side towards photodetector 402), thereby making the irradiance profile asymmetric even at the rest position, wherein the reflector angle is zero. This misalignment may therefore result in a non-zero differential signal (e.g., $S_x \neq 0$, as in FIG. 2D), as shown by signal curve 2 302 (FIG. 3).

Figure 7:
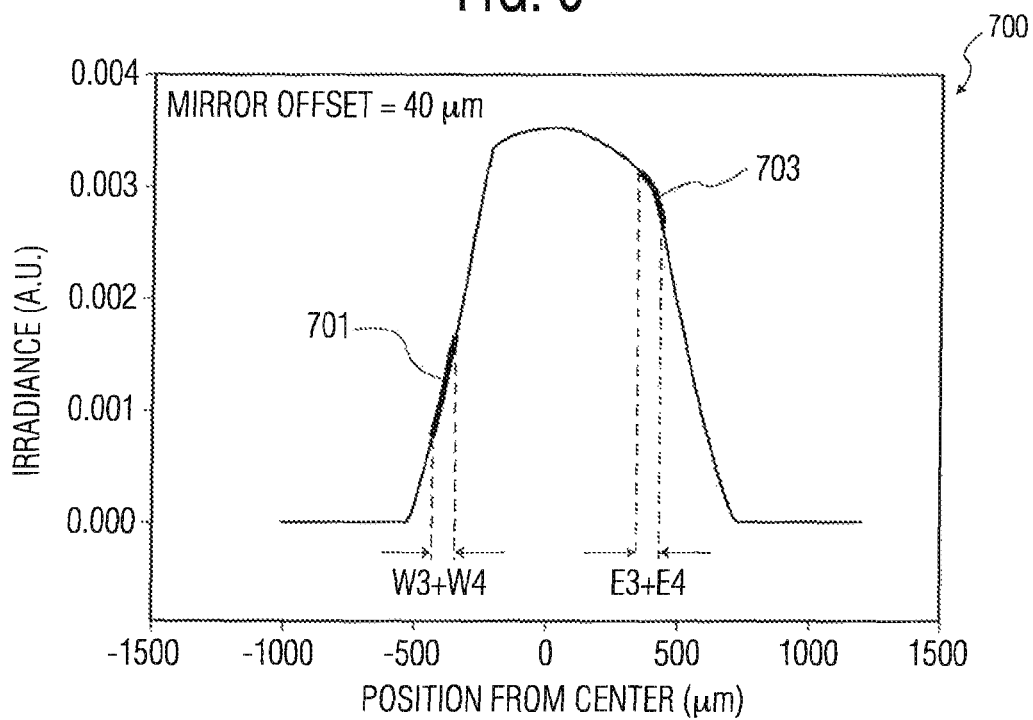
FIG. 7 depicts an irradiance profile for the optical joystick shown in FIG. 6.

FIG. 7 shows an irradiance profile 700 for the optical joystick shown in FIG. 6 with reflector misalignment as described above. In this profile 700, the signal 701 generated by active elements W3, W4 is no longer relatively equal to the signal 703 generated by active elements E3, E4. As a result, a non-zero differential signal (e.g., $S_x$) may therefore be generated ($S_x \neq 0$).

Figure 8:
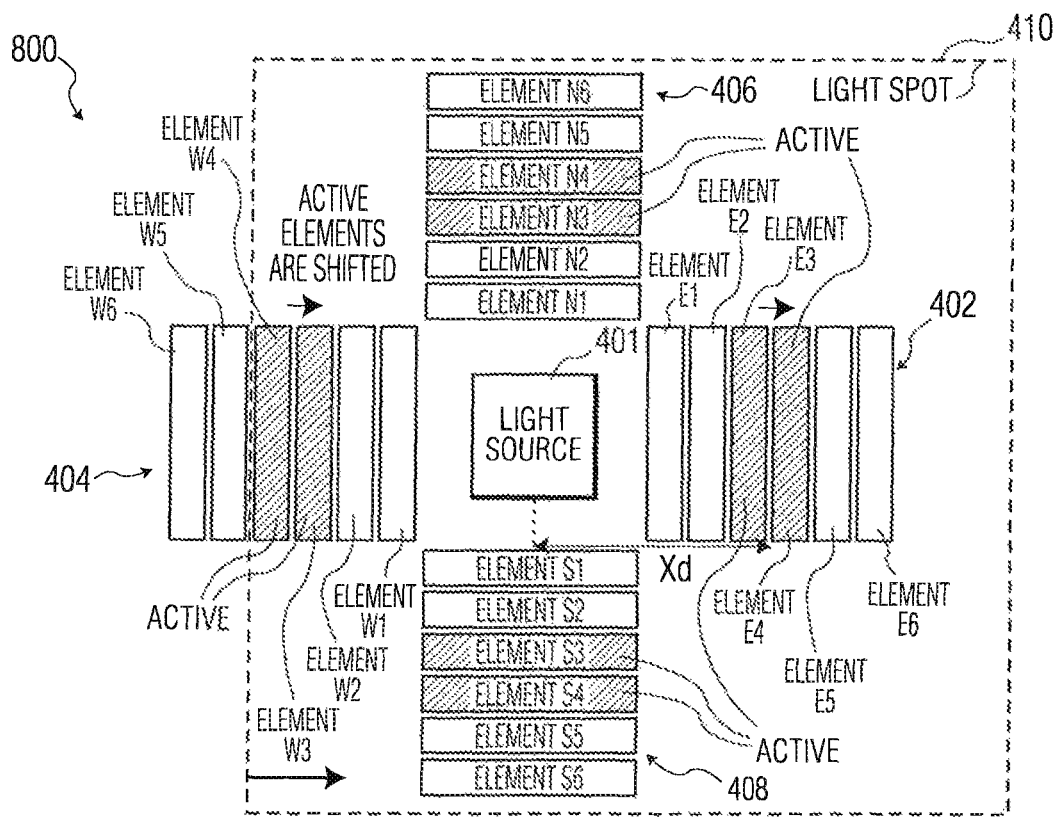
FIG. 8 is a top plan view showing the joystick of FIG. 6 but with active elements shifted in a horizontal direction to compensate for reflector misalignment.

FIG. 8 shows a joystick 800 similar to joystick 400 of FIG. 6, but with the active elements in photodetectors 402 and 404 "shifted" (e.g., electrically shifted by electrically controlling which elements are "active") on the X-axis to compensate for reflector misalignment in the X-axis. In some embodiments, the shifting may be done in one or more steps. If, for example, the X-axis offset of the light spot 410 due to misalignment is 80 μm, the active photodetector elements are electrically shifted on the X-axis such that photodetector elements W2, W3 and E4, E5 are now activated instead of photodetector elements W3, W4 and E3, E4 to enable the a zeroed differential signal $S_x$, compensating for the reflector misalignment. By activating the different photodetector elements located at the appropriate positions within the photodetector array 402-408 when the reflector is in the rest position, it may therefore be possible to compensate for the misalignment of the reflector and light spot 410, instead of having to physically reposition the photodetector elements after the initial setting, or discarding the misaligned substrate.

Figure 9:
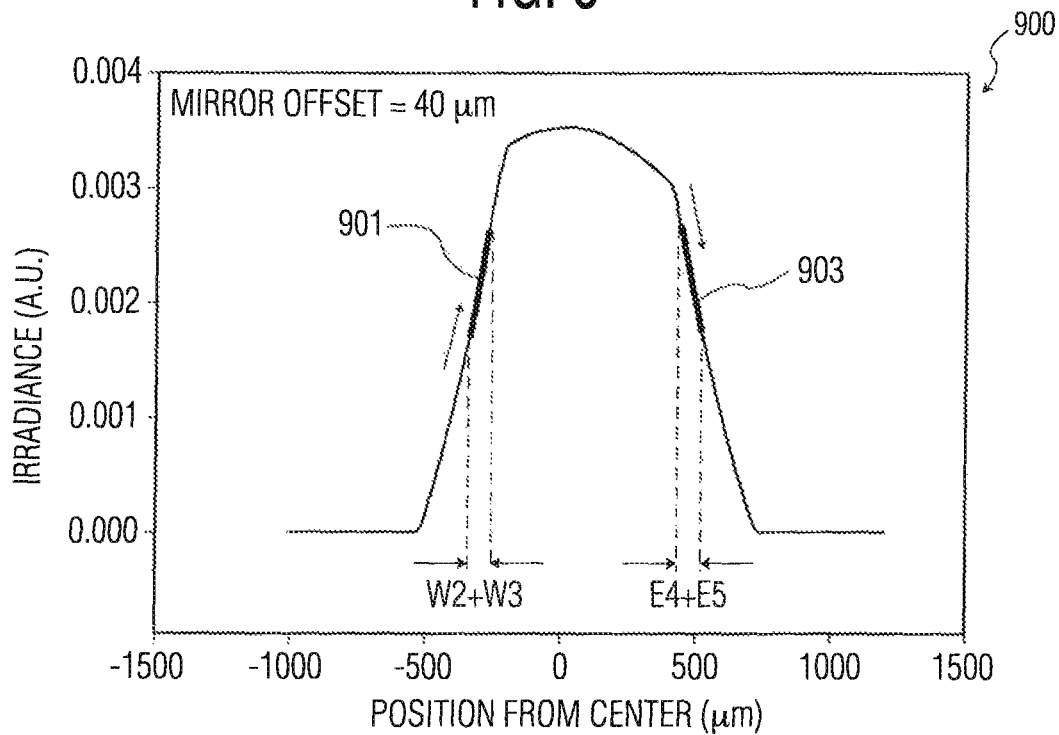
FIG. 9 depicts an irradiance profile for the optical joystick shown in FIG. 8.
Figure 10:
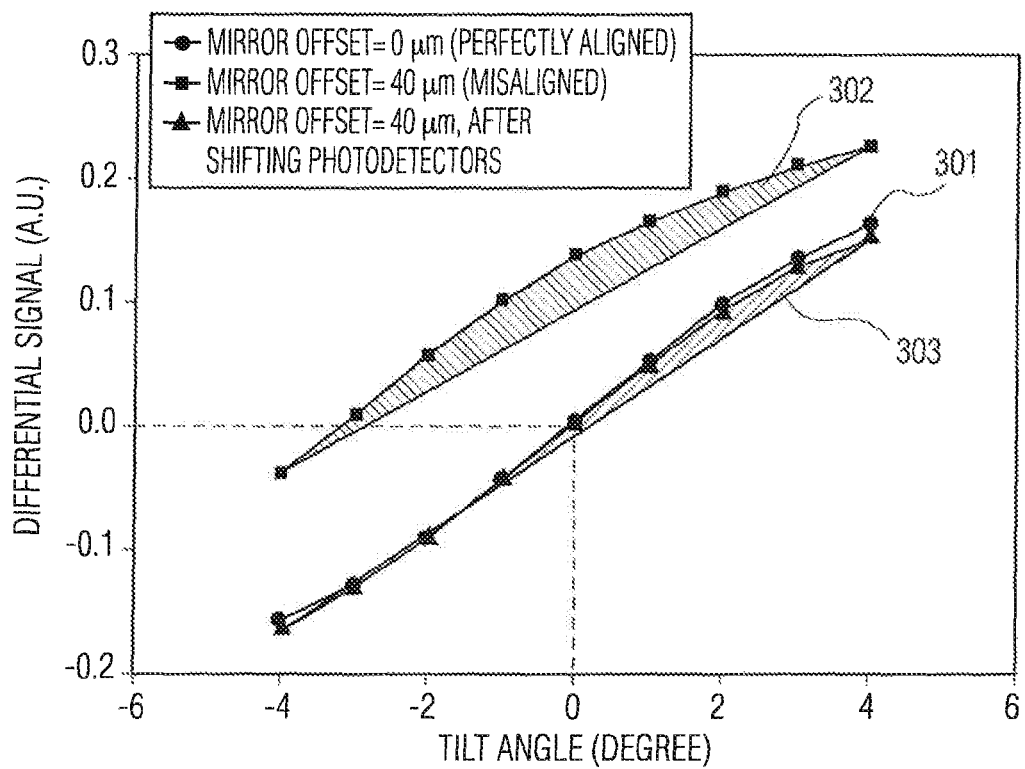
FIG. 10 depicts the calculated differential signal versus reflector angle in different example scenarios.

FIG. 9 shows a calculated irradiance profile 900 for the joystick 800 shown in FIG. 8. In this profile 900, the signal 901 generated by active elements W2, W3 is substantially equal to the signal 903 generated by active elements E4, E5. As a result, a differential signal (e.g., $S_x$) equal to zero is again generated ($S_x=0$). FIG. 10 illustrates a differential signal 303 as a function of reflector tilt angle for the embodiment shown in FIG. 8 (compensating for the reflector misalignment). In this embodiment, the differential signal curve 303 (shown with triangular datapoints) after electrical shifting of the active photodetector elements in photodetectors 402 and 404 becomes symmetric and almost exactly matches the differential signal curve 301 of perfect reflector alignment. Slight alignment errors that remain after the above-described compensation by way of the electrical shifting may then be compensated for through further compensation techniques, such as those disclosed in published application WO2010/020906, the entire contents of which are incorporated herein by reference.

It will be appreciated that the compensation technique described with reference to FIG. 8 above may also be similarly applied on the Y-axis for photodetectors 404 and 408, or generally in both the X-axis and Y-axis, as desired, in order to compensate for misalignment in any direction on the X-Y plane. Other embodiments may involve similar compensation techniques based on the geometric arrangement of the photodetector elements comprising the photodetector array 402-408. Various embodiments described to compensate for misalignments may also be used to compensate for misalignments that result from errors in reflector position, reflector initial angle (wherein a reflector is not at zero degrees at a rest position), or position of the light source 401.

The compensation technique may be employed when at least one of the errors occurs. In some embodiments, the compensation technique may be employed when a plurality of errors occur in combination.

The shifting (e.g., electrical shifting) of the active photodetector elements in the photodetector array 402-408 may be performed during manufacture of the joystick, (e.g., during testing) and/or during subsequent routine operation of the joystick (for example, a re-calibration function that tests for misalignment and, if necessary, corrects for any detected misalignment by altering which photodetector elements are active could be provided). Electrically shifting the active photodetector elements may occur by sending commands to control circuitry 422 (FIG. 4B) on an ASIC formed on a substrate. Optimum alignment positions of the active photodetector elements in photodetector array 402-408 may then be stored in a memory in control circuitry 422 and set as the default configuration before the joystick 800 is operated by a user.

The following calculations may be used to determine the appropriate electrical shift in photodetector position and may be used to determine which photodetector elements to activate. Such calculations are only exemplary, and it is not required to satisfy these equations to practice this invention.

Consider, for example, that the reflector is misaligned on the X-axis and Y-axis by a quantity δ. In order to compensate for this misalignment, the photodetector elements that are active (e.g., W3, W4, and E3, E4 of photodetectors 402 and 404) may have to be shifted in the same photodetector array 402-408 by an amount of $\delta_x$, according to the equations:

$$\delta_x = \frac{H\delta}{h} - \frac{(x_2 - x_d)(1-\gamma)}{(1+\gamma)}$$

$$H = 2h + h_L$$

$$x_2 = \frac{(r_0 + r_s)H - hr_s}{h}$$

$$\gamma = I_r / I_l$$

$$I_r = \frac{1}{H}\left[\frac{H(r_s - x_{1r})}{H^2 + (r_s - x_{1r})^2} - \frac{H(-r_s - x_{1r})}{H^2 + (-r_s - x_{1r})^2} + \arctan\left(\frac{r_s - x_{1r}}{H}\right) - \arctan\left(\frac{-r_s - x_{1r}}{H}\right)\right]$$

$$I_l = \frac{1}{H}\left[\frac{H(r_s - x_{1l})}{H^2 + (r_s - x_{1l})^2} - \frac{H(-r_s - x_{1l})}{H^2 + (-r_s - x_{1l})^2} + \arctan\left(\frac{r_s - x_{1l}}{H}\right) - \arctan\left(\frac{-r_s - x_{1l}}{H}\right)\right]$$

$$x_{1r} = \frac{(r_0 - r_s)H + hr_s + H\delta}{h}$$

$$x_{1l} = \frac{(r_0 - r_s)H + hr_s - H\delta}{h}$$

In which:

$\delta_x$ is the required distance of active shift on the X-axis to compensate for reflector misalignment 8.

δ is the offset (misalignment) quantity of the reflector.

h is the distance from the light source surface to the reflector.

$x_d$ is the distance from midpoint of a photodetector to the center of the photodetector configuration (see FIG. 8).

H is the total distance from the image of the light source to substrate.

$x_2$ is the distance of the point where irradiance vanishes to the center of the die (in the case of good alignment and tilt angle, $x_2$ is zero).

γ is the ratio of $I_r$ to $I_l$, with $I_r$, $I_l$ being irradiance values at joint points between the dome-shaped top part of the irradiance profile and the (almost) straight shoulders to the right and left of the center dome-shaped top part. Here it is assumed that the reflector is misaligned to the right side.

$h_L$ is the light source height compared to the photodetector plane.

$r_0$ is the half size of the reflector.

$r_s$ is the half size of the light source.

Figure 11:
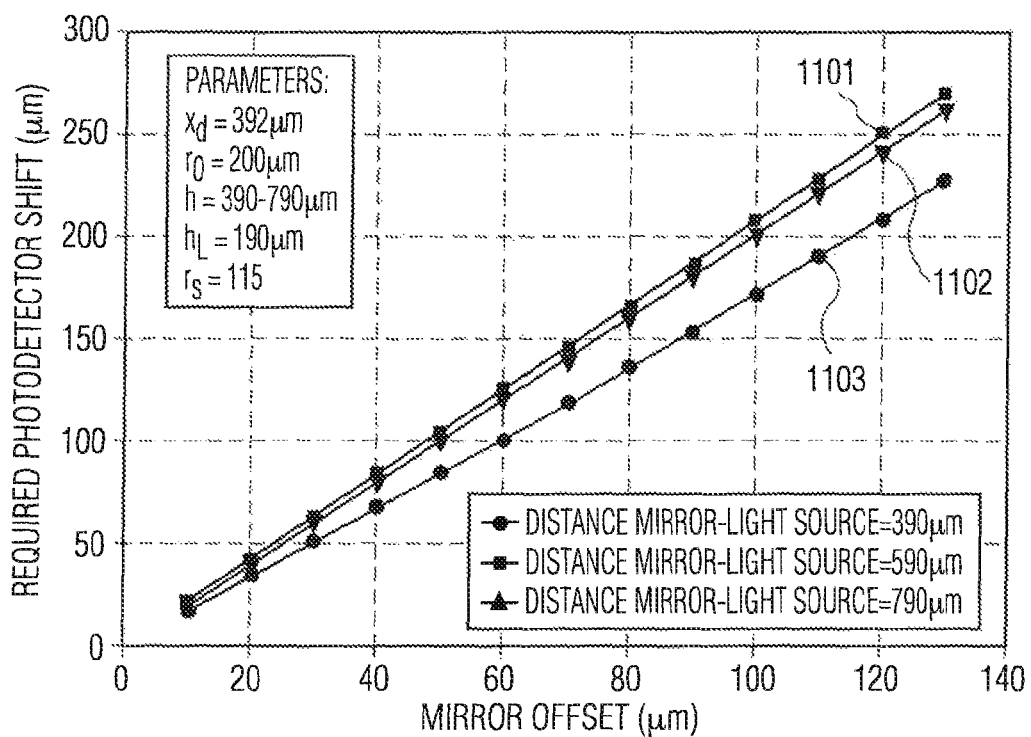
FIG. 11 depicts the reflector offset on the X-axis and the photodetector shift on the Y-axis in order to compensate for misalignment of the reflector in accordance with various embodiments.

FIG. 11 shows the relationship between reflector offset and photodetector shift in order to compensate for misalignment of the reflector in accordance with the embodiment shown in FIG. 8. FIG. 11 was generated using dimensional data in the foregoing formulas. Lines 1101-1103 are lines with different values of h.

Figure 12A:
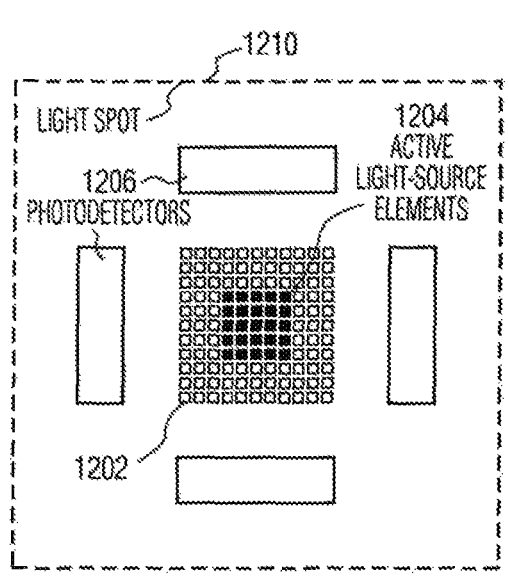
FIG. 12A is a high-level schematic of an optical joystick wherein the light source is partitioned into a 2D array of elements and the reflector is well-aligned in accordance with another embodiment.

FIG. 12A shows an optical joystick, in accordance with another embodiment, wherein the light source is partitioned into a two-dimensional (2D) array of light-source elements. Optical joystick 1200 in FIG. 12 has light-source array 1202, where the reflector is well-aligned, wherein active elements of the light source array 1202 is located at the center of the light source as shown by active light-source elements 1204. The joystick 1200 also includes a plurality of photodetectors 1206 and light spot 1210. In the embodiment shown, active partitioned light-source elements 1204 are shown in black and form a working light source. It will be appreciated that the light-source array 1202 may be partitioned into other geometric shapes (e.g., a circle, arc, pie, square, hexagon, octagon, etc.) in a similar manner as the photodetector array 402-408 of the joystick 400.

Figure 12B:
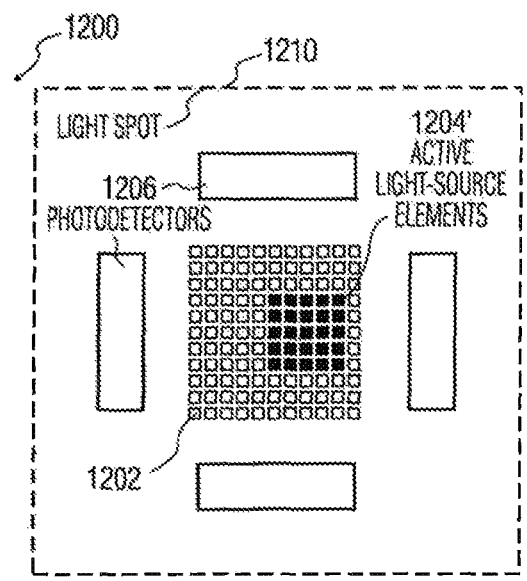
FIG. 12B shows the same device when the reflector is misaligned.

FIG. 12B illustrates how this embodiment can compensate in the instance where the reflector is misaligned, resulting in a shift of active light-source elements 1204' away from the center. In this instance, a misalignment on the X-axis results in a horizontal shift of active light-source elements 1204' in the light-source array 1202. The active light-source elements 1204' have shifted to a new position relative to the position of the active light-source elements shown in FIG. 12A in order to compensate for the misalignment of various optical components of the joystick 1200. The joystick 1200 may then compensate for the misalignment through by electrical shifting of the active light-source elements 1204' such that the light spot returns to the center position as shown by active light-source elements 1204 in FIG. 12A. This compensation generates an irradiance profile and a differential signal that are symmetric, similar to that of irradiance profiles 500 and 900 in FIGS. 5 and 9, respectively. Electrical shifting can be accomplished by driving a control circuit 422 (FIG. 4B) formed in an ASIC that can be formed on a semiconductor substrate.

The light-source array 1202 may be, for example, light-emitting diode (LED) dies, or organic LEDs (OLEDs) mounted onto a substrate that includes photodetectors 1206. OLEDs may be preferred, as they may be patterned into a plurality of light-source elements using a deposition technique (e.g., shadow mask or printing techniques). OLEDs have a plurality of pixels, where each pixel can be individually controlled thereby providing better control in selective activation and deactivation of individual pixels, thus providing enhanced control in the electrical shifting of active light source elements to compensate for misalignment of optical components.

Figure 13A:
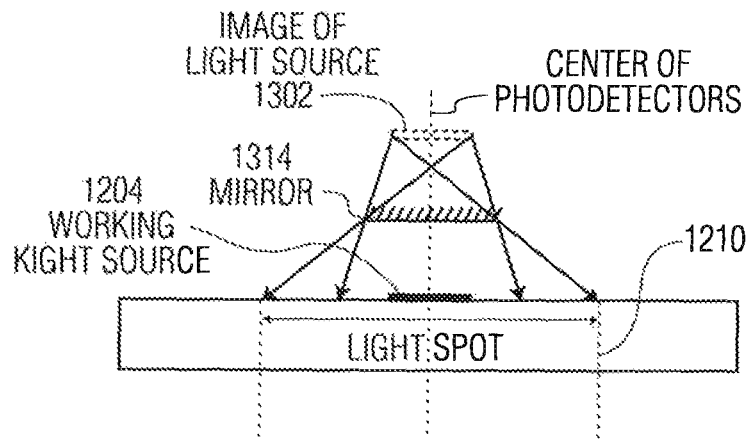
FIG. 13A is a high-level side view showing the optical geometry of joystick of FIG. 12 and a method of shifting the light source to achieve alignment—diagram.

FIG. 13A shows the optical geometry of joystick 1200 of FIG. 12 and illustrates a method of shifting active light-source elements to achieve regular alignment. FIG. 13A shows a state when reflector is well-aligned, wherein the working active light-source elements 1204 are located at the center of the light source array 1202. The light spot 1210 is created by the reflection of the light, generated by the light source, on the reflector 1314, and back onto the photodetector plane 1208 (having a plurality of photodetectors). The light spot can be considered to be created by an image 1302 of the light source 1204 over the reflector 1314. The light source image 1302 can shine light through an imaginary hole created by an outline of the reflector 1314, thereby casting a light spot on the photodetector plane 1208.

Figure 13B:
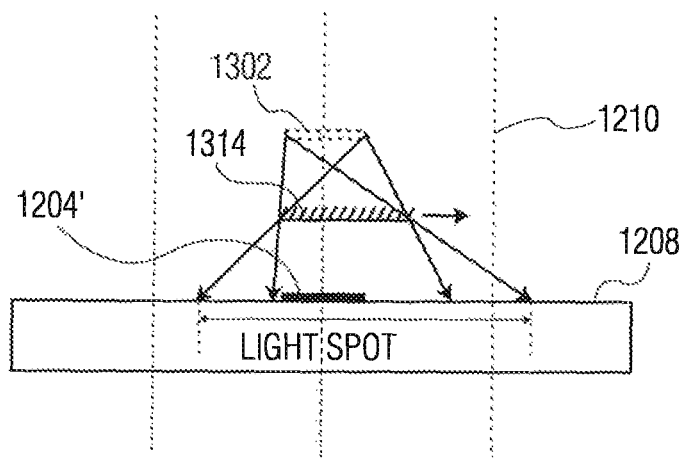
FIG. 13B shows when the reflector is misaligned to the right.
Figure 13C:
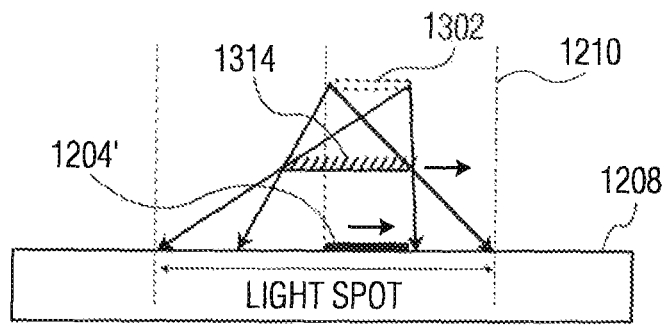
FIG. 13C shows the reflector misalignment is compensated by shifting the working light source further to the right.

FIG. 13B shows the optical geometry when the reflector is misaligned, while FIG. 13C shows compensation for the misalignment by shifting the active light-source elements 1204. As described above in FIG. 8 with respect to the embodiment that included a photodetector array 402-408 with a plurality of photodetector elements, the shifting of active light-source elements 1204 may be done by shifting locations of active light-source elements in a similar stepwise method.

Figure 14:
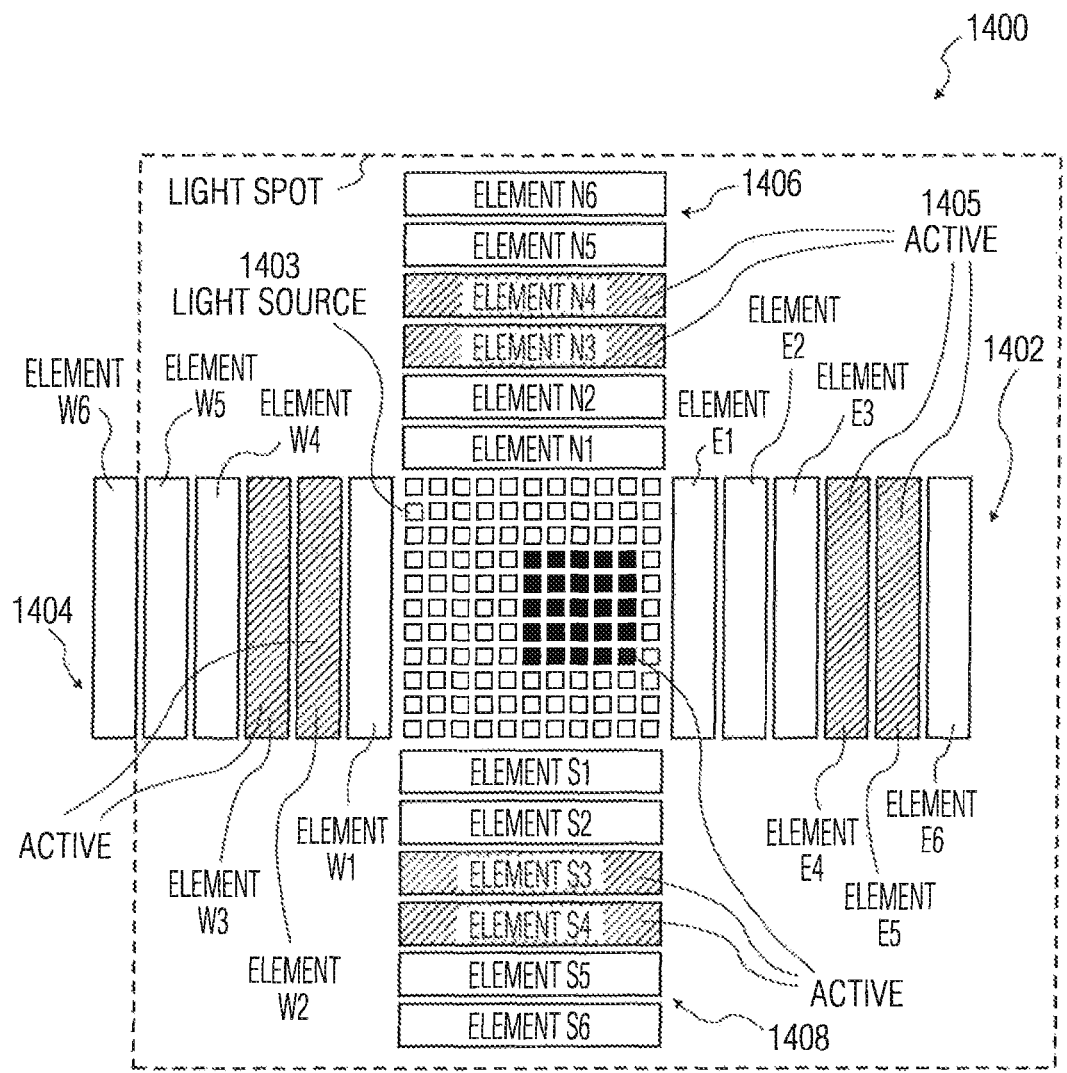
FIG. 14 is a top plan view showing various components of an optical joystick in accordance with another embodiment wherein both photodetectors and a light source are partitioned and active elements are allowed to shift to compensate for misalignment of optical components.

FIG. 14 shows various components of an optical joystick 1400 in accordance with another embodiment wherein photodetectors 1402-1408 and the light-source array 1403 are partitioned and active photodetector elements and active light-source elements 1405 (together referred to as "active elements" in this embodiment), are driven using control circuitry 422 (FIG. 4B) to electrically shift in a desired direction to compensate for misalignment of optical components of the joystick 1400. The active elements may be selectively shifted in the X and/or Y directions so as to compensate for reflector misalignment on the X-axis and/or Y-axis and/or an initial non-zero angle of the reflector in any direction. The amount and direction of the shifting (e.g., electrical shifting) of photodetector elements and/or the light-source elements that need to be shifted should be such that the differential signals $S_x$ and $S_y$ are substantially zero at a rest position, for example, according to the calculations in [0055]-[0062] and FIG. 11. In this embodiment, the light-source array 1403 and the photodetector array 1402-1408 may be shifted together, thus making the light spot unchanged relative to photodetector positions. The irradiance profile observed at the active photodetector elements and the resulting differential again remain symmetric, similar to the irradiance profiles 500 and 900 in FIGS. 5 and 9, respectively.

Figure 15:
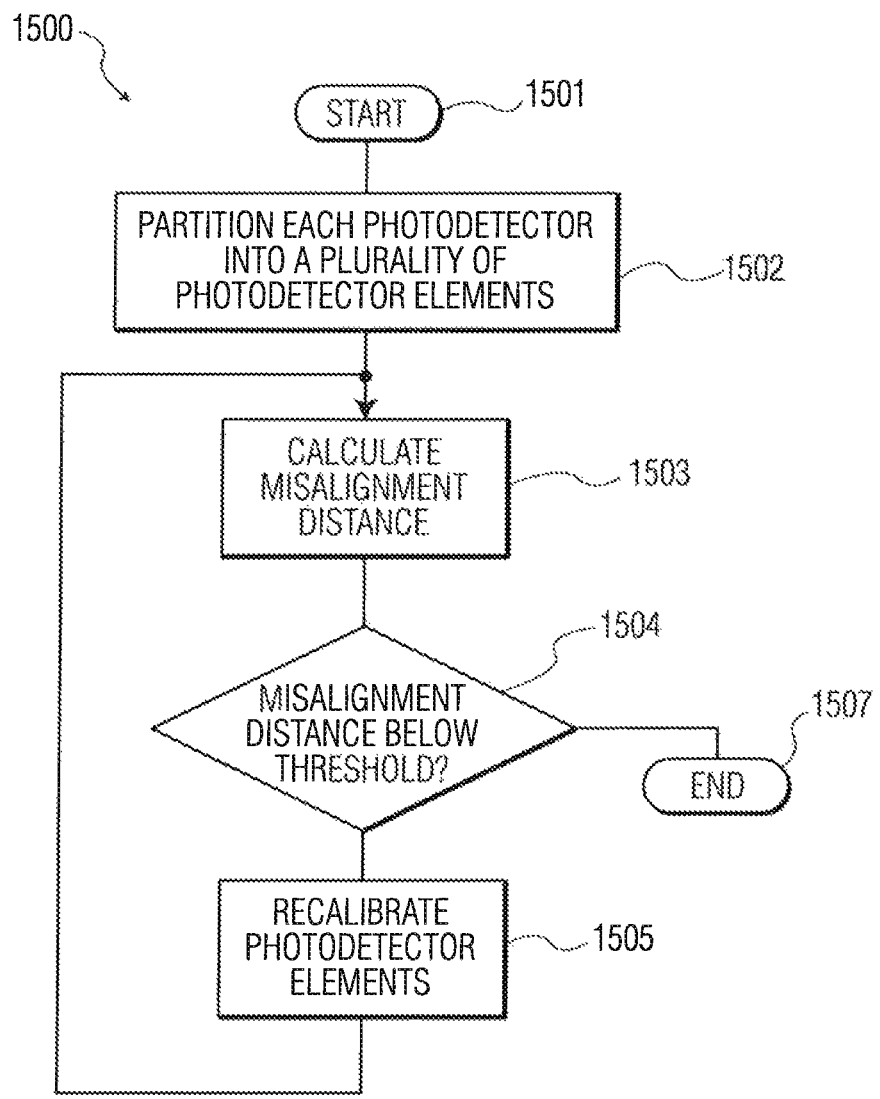
FIG. 15 shows a flow methodology to compensate for misalignment of optical elements of a joystick in accordance with various embodiments.

FIG. 15 illustrates a flowchart of exemplary method 1500 to compensate for misalignment of optical elements of a joystick in accordance with various embodiments.

Beginning at step 1501, at step 1502, each of a plurality of photodetectors in the photodetector array 402-408 are partitioned into a plurality of photodetector elements. Certain photodetector elements may initially be active in each photodetector of photodetector array 1402-1408. In step 1503, the control circuit 422 finds the distance of misalignment. This may be done for example, by using the calculations of equations [0055]-[0062] to find values applicable variables, such as shift quantity δ. In step 1504, the differential signals are compared to a pre-defined threshold. If the values of the differential signals are below the threshold, then the differential signals may be at a minimum value, and method 1500 may end at step 1507. Otherwise, method 1500 may proceed to step 1505, where selected photodetector elements from the plurality of photodetector elements in the photodetector array 402-408 are activated to cause an electrical shift in joystick 400.

Method 1500 may then return to step 1503, finding the new misalignment distance and in step 1504, compare the resultant differential signals against a defined threshold. Method 1500 may end at step 1507 when the differential signals are below the defined threshold. Partitioning of each of the photodetectors 402-408 into a plurality of photodetector elements may be performed in a design phase of the joystick 400, while selection of photodetector elements to activate an electrical shift may be performed during a testing and calibration phases.

Figure 16:
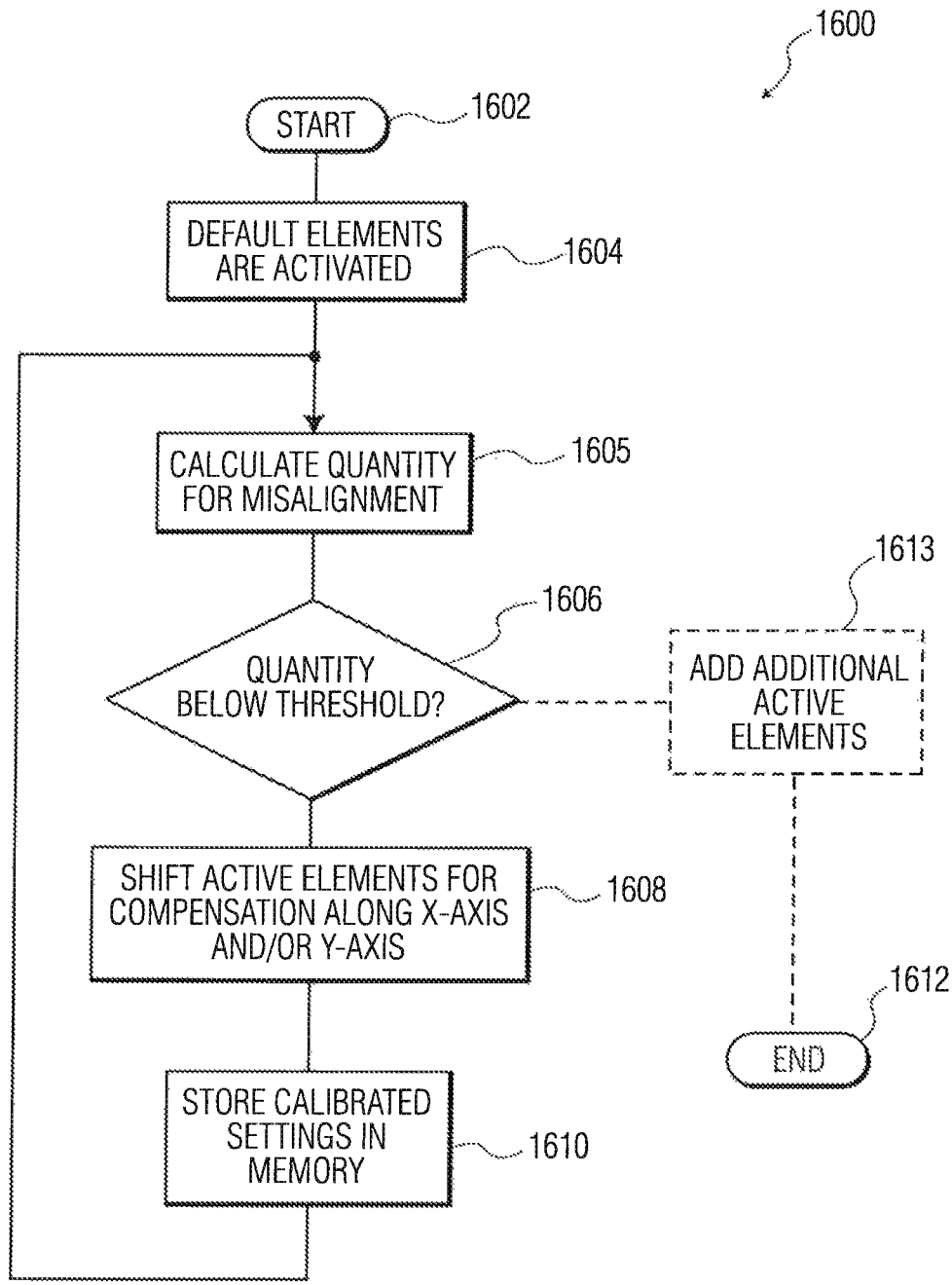
FIG. 16 shows a calibration method to compensate for misalignment of one or more of photodetectors or light source in accordance with various embodiments.

FIG. 16 illustrates an exemplary flowchart for calibration method 1600 to compensate for misalignment of one or more of the photodetectors and/or light source in accordance with various embodiments. The calibration process starts at step 1602. At step 1604, the initial position of active elements (e.g., either active photodetector elements in photodetector array 402-408 or active light-source elements 1204) is located to be in the middle of a photodetector configuration or a light-source configuration, respectively, and the middle position of the active elements may then be used to start the calibration process. For example, in one embodiment including an array of photodetectors 402-408 partitioned into a plurality of photodetector elements as shown in FIG. 6, photodetector elements W3, W4, E3, E4, and N3, N4, S3, S4 are set to be active. In other embodiments, where the calibration of the active light-source elements 1204 is desired, FIG. 12A may show the initial configuration identified at step 1604 and active light-source elements 1204 are shown as marked in black.

The calibration process may be performed by shifting the elements that are active in the photodetector array 402-408 and/or light-source array 1202 on the X-axis and/or Y-axis in order to compensate for a misalignment. In step 1605, the control circuitry 422 may find distance of misalignment. This quantity may be calculated as the quantity δ. The control circuitry 422 may also record the differential signals $S_x$ and $S_y$. The quantity δ may be a vector and may possess non-zero values on the x-axis and/or y-axis, which may be represented as $δ_x$ and $δ_y$. This misalignment quantity may be proportional to or the same as the differential signals, with quantities $δ_x$ and $δ_y$ being proportional or equal to differential signals $S_x$ and $S_y$, respectively.

In step 1606, the control circuitry 422 may compare the differential signals to defined thresholds. In some embodiments, the defined threshold may be substantially equal to zero. If the differential signals $S_x$ or $S_y$ are lower than the defined threshold, then the differential signal below the defined threshold may be at the minimum value. When both differential signals are below the defined thresholds, the elements for the minimum values of the differential signals are set active, and method 1600 may end at step 1618. In some embodiments, additional active elements may also be added in step 1616. Otherwise, when the quantity or differential signals are at or above the threshold, method 1600 may then proceed to step 1608. It should be understood that this step is optional.

At step 1608, the control circuitry may calibrate the joystick by changing the active elements along an axis. The control circuitry may shift the active elements along an axis when the differential signal for that axis is above the threshold. In the illustrative embodiment, after recoding the differential signal $S_x$ from photodetectors 402, 404 in step 1605 and determining that $S_x$ was above the threshold value, the control circuitry 422 may shift the active photodetector elements (e.g., W3, W4, E3, and E4) on the X-axis. This may involve, for example changing the active elements from W4, W3, E3, and E4 to W3, W2, E4, and E5, respectively. In some embodiments, step 1605 may include multiple shifts of active elements along the axis. In step 1610, the control circuitry 422 may record the configuration settings of the shift. In some embodiments, this may involve the control circuitry 422 recording the minimum differential signal and the applicable configuration of active elements that produced the minimum differential signal.

In step 1612, the control circuitry may repeat the shifting of step 1608, but on a different axis. In the illustrative embodiment, if the differential signal $S_y$ (monitored from photodetectors 404, 408) was also above a defined threshold, at step 1612, the control circuitry 422 may shift the active photodetector elements (N3, N4, S3, S4) on the Y-axis. In step 1614, in a manner similar to step 1610, the control circuitry 422 may record the configuration of the switch. In some embodiments, the control circuitry may record the differential signal $S_y$ that is at a minimum is recorded during the shift along the Y-axis, along with the configuration settings that produced the minimum differential signal.

After step 1614, the configurations saved in step 1610 and 1614 may again be compared to the threshold values. If they remain above the threshold values, control circuitry 422 may repeat steps 1608-1614. If they are below the differential thresholds, then this may, for example indicate that the saved configuration is the optimum configuration. Method 1600 may then end in step 1618. The configuration of the active elements may then be retrieved every time upon turning on the device during operation, with the control circuitry 422 setting corresponding elements active. During the calibration process, care is observed to ensure that the pitch of the active photodetector elements remains unchanged.

In the embodiment where calibration for the light source is desired, active light-source elements are shifted from an initial position shown by 1204 to a shifted position 1204', with the calibration process being performed in the manner described above in steps 1602-1614, where the control circuitry 422 shifts the active light-source elements 1204' on X-axis and Y-axis within the light-source array 1202 so that the positions of the active light-source elements 1204 produce a minimum differential signals $S_x$ and $S_y$ that are below defined thresholds, the configuration of which may then be recorded and stored as the optimum configuration.

The goal of the above described calibration process is to ensure that the differential signals $S_x$ and $S_y$ are at a minimum and substantially close to the defined threshold (e.g., zero). After step 1614, the calibration process of steps 1606-1614 may be repeated until the differential signals $S_x$ and $S_y$ reach a value below the defined threshold or at sufficiently minimum values. Once below the threshold value, the calibration process stops at step 1606.

After determining the optimum position for the active photodetector elements, in an optional step 1616, additional elements may also be activated on both sides of the initially optimized active elements to maximize output signal of the active photodetector elements. For example, after determining the optimum positions of active elements for the photodetector array 402-408 as illustrated in FIG. 8, where W2, W3, E4, E5, N3, N4, and S3, S4 are activated, the control circuitry 422 in step 1616 may activate additional photodetector elements while keeping the shift position unchanged.

For example, on the X-axis, in addition to the W2, W3, E4, E5 active photodetector elements, photodetector elements W1, W4, E3, E6 may also be activated (e.g., turned ON). Whether other photodetector elements that are adjacent to the initially optimized photodetector positions can be turned ON depends on how many photodetector elements are still available to be turned ON. It will be appreciated that the extension of the active photodetector elements allows higher signal amplitude, while the shift position to compensate for the misalignment can still be maintained. In the embodiment where calibration of active light-source elements 1204' are performed, light-source elements in the light-source array 1202 adjacent to active light-source elements 1204' may be activated in order to obtain a higher signal amplitude, while the shift position to compensate for the misalignment may still be maintained.

The calibration process described above can be controlled and executed by control circuit 422 (FIG. 4A) or by an external program residing in a testing tool.

Problems related to optical component misalignments are resolved as described in various embodiments which, as a result, relaxes tolerances in the assembly process. Using various embodiments, active alignment of optical elements of a joystick, during the assembly process can be avoided, thereby significantly reducing fabrication costs. Further, alignment is performed electrically rather than mechanically, thus making the assembly process simpler and faster. The joystick disclosed according to various embodiments can be used to control cursor on a display of hand-held devices (e.g., mobile devices) for such exemplary applications as navigation, gaming, web browsing, and communications. The joystick can further be used in PDAs, remote control, game consoles, media players, etc.

Although the various exemplary embodiments have been described in detail with particular reference to certain exemplary aspects thereof, it should be understood that other embodiments and its details are capable of modifications in various obvious respects. As is readily apparent to those skilled in the art, variations and modifications can be affected while remaining within the spirit and scope of the embodiments. Accordingly, the foregoing disclosure, description, and figures are for illustrative purposes only and do not in any way limit the embodiments described, which is defined only by the claims.

The invention claimed is:

1. An optical joystick, comprising:
   circuitry for controlling operation of the optical joystick;
   a light source; and
   a plurality of photodetectors partitioned into a plurality of photodetector elements,
   wherein select photodetector elements are configured to be individually activated in order to cause an electrical shifting of the selected photodetector elements to achieve a different alignment position of optical components of the optical joystick, and further wherein at least one of the photodetector elements of each of the photodetectors is activated.

2. The optical joystick of claim 1, wherein a signal from a respective photodetector of the plurality of photodetectors is a sum of signals from activated photodetector elements comprised in the respective photodetector and further wherein photodetector elements disposed on opposite sides of the light source are activated so as to produce a substantially zero differential signal at a rest position.

3. The optical joystick of claim 1, further comprising:
   a reflector disposed facing the light source, and wherein the electrical shifting compensates for misalignments related to at least one of a reflector position, a reflector initial angle, and a position of the light source.

4. The optical joystick of claim 1, wherein the electrical shifting is performed by sending commands to the control circuitry.

5. The optical joystick of claim 1, wherein at least one of the light-source elements is activated by driving the control circuitry.

6. A hand-held communication device, comprising:
   a housing having an integrated circuit, a display for displaying information, an optical joystick for enabling a user to select information displayed on the display device, the optical joystick having:
   circuitry for controlling operation of the optical joystick;
   a light source; and
   a plurality of photodetectors partitioned into a plurality of photodetector elements,
   wherein select photodetector elements are configured to be individually activated in order to cause an electrical shifting of the selected photodetector elements to achieve a different alignment position of optical components of the optical joystick and further wherein at least one of the photodetector elements of each of the photodetectors is activated.

7. The hand-held device of claim 6, wherein the electrical shifting is performed by sending commands to the control circuitry.

8. The hand-held communication device of claim 6, wherein a signal from a respective photodetector of the plurality of photodetectors is a sum of signals from activated photodetector elements comprised in the respective photodetector and wherein photodetector elements disposed on opposite sides of the light source are activated so as to produce a substantially zero differential signal at a rest position.

9. The hand-held communication device of claim 6, further comprising:
   a reflector disposed to directly facing the light source, and wherein the electrical shifting compensates for misalignments related to at least one of a reflector position, a reflector initial angle, and a position of the light source.

10. An optical joystick, comprising:
    control circuitry for controlling operation of the optical joystick;
    a plurality of photodetectors; and
    a light source partitioned into a plurality of light-source elements arranged in a two-dimensional array,
    wherein select light source elements of the plurality of light-source elements are configured to be individually activated to cause an electrical shifting of the selected light-source elements to achieve a different alignment position of optical components of the joystick and further wherein at least one of the light-source elements is activated by driving the control circuitry.

11. A hand-held communication device, comprising:
    a housing having an integrated circuit, a display for displaying information, an optical joystick for enabling a user to select information displayed on the display device, the optical joystick having:
    circuitry for controlling operation of the joystick
    a plurality of photodetectors; and
    a light source partitioned into a plurality of light-source elements arranged in a two-dimensional array,
    wherein select light source elements of the plurality of light source elements are configured to be individually activated to cause an electrical shifting of the selected light-source elements to achieve a different alignment position of optical components of the joystick.

12. A method for calibrating an optical joystick for misalignment of one or more optical components, each optical component being partitioned into a plurality of elements, the method comprising:
    determining an initial location of active elements of the one or more optical components;
    monitoring differential signals of the active elements to determine optical component misalignment;
    electrically shifting, upon determining the optical component misalignment the active elements, in a desired direction to achieve a differential signal;

repeating said shifting step until a differential signal at a rest position that is substantially close to a zero value is obtained;

storing a position of the active elements producing the differential signal that is substantially close to a zero value; and recording the stored position as a new default location for the one or more optical components.

13. The method of claim 12, wherein the one or more optical components comprise at least one of photodetectors, light source, or both.

14. The method of claim 13, wherein the photodetector is partitioned into a plurality of photodetector elements.

15. The method of claim 13, wherein the light source is partitioned into a plurality of light source elements.

* * * * *